US009738566B2

(12) United States Patent
Thomsen et al.

(10) Patent No.: US 9,738,566 B2
(45) Date of Patent: Aug. 22, 2017

(54) PROCESS FOR THE PRODUCTION OF A PRODUCT BASED ON FAECALS PRODUCED BY ANIMALS AS WELL AS A PLANT FOR THE PRODUCTION OF THE PRODUCT, ESPECIALLY A FERTILIZER PRODUCT

(71) Applicant: WASTE 2 GREEN, LLC, Cocoa, FL (US)

(72) Inventors: Jes Thomsen, Værløse (DK); Kurt Schrøder, Rønne (DK); Dennis Wowern Nielsen, Rønne (DK)

(73) Assignee: WASTE 2 GREEN, LLC, Cocoa, FL (US)

( * ) Notice: Subject to any disclaimer, the term of this patent is extended or adjusted under 35 U.S.C. 154(b) by 0 days.

(21) Appl. No.: 14/667,055

(22) Filed: Mar. 24, 2015

(65) Prior Publication Data
US 2015/0197458 A1 Jul. 16, 2015

Related U.S. Application Data

(63) Continuation of application No. 12/528,515, filed as application No. PCT/DK2008/050046 on Feb. 26, 2008, now abandoned.

(30) Foreign Application Priority Data

Feb. 26, 2007 (DK) .................................. 2007 00291
Dec. 21, 2007 (DK) .................................. 2007 01854

(51) Int. Cl.
*C05F 3/06* (2006.01)
*C05F 3/00* (2006.01)
(52) U.S. Cl.
CPC .................. *C05F 3/00* (2013.01); *C05F 3/06* (2013.01); *Y02P 20/145* (2015.11); *Y02W 30/43* (2015.05)

(58) Field of Classification Search
CPC   C05F 3/00; C05F 3/06; Y02P 20/145; C02W 30/43
See application file for complete search history.

(56) References Cited

U.S. PATENT DOCUMENTS 3,865,568 A   2/1975   Kratzer
4,078,094 A   3/1978   Katzen
(Continued)

FOREIGN PATENT DOCUMENTS

DE   301550   10/1917
DE   134477   1/1978
(Continued)

OTHER PUBLICATIONS

International Search Report dated Aug. 6, 2008, issued in corresponding international application No. PCT/DK2008/050046.
(Continued)

*Primary Examiner* — Richard M Rump
(74) *Attorney, Agent, or Firm* — Ostrolenk Faber LLP

(57) ABSTRACT

The present disclosure relates to a process for producing a product based on faecals produced by animals, characterized in that faecals from mammals are wholly or partially dissolved using an oxidizing acid, solid acid-insoluble components are separated, if necessary, and the liquid component is neutralized with a base. Moreover, the invention relates to a plant for producing a product, the plant comprising a faecal reactor for receiving animal faecals, wherein the reactor is provided with means for supplying an oxidizing acid, possibly a separator unit for separating solid, acid-insoluble components, and a neutralizing reactor for neutralizing the part of the faecals dissolved by means of the oxidizing acid, wherein the neutralizing reactor is provided with means for supplying a base. The invention provides a substantially odorless product for use as fertilizer for a crop.

20 Claims, 1 Drawing Sheet

(56) References Cited

U.S. PATENT DOCUMENTS

| | | | |
|---|---|---|---|
| 4,201,564 | A | 5/1980 | Kauzal |
| 4,225,676 | A | 9/1980 | Zaitsev et al. |
| 4,369,199 | A | 1/1983 | Katzen |
| 5,378,257 | A | 1/1995 | Higashida |
| 5,385,673 | A | 1/1995 | Fergen |
| 2004/0065127 | A1 | 4/2004 | Connell |
| 2007/0175825 | A1 | 8/2007 | Denney |

FOREIGN PATENT DOCUMENTS

| | | |
|---|---|---|
| DE | 197 24 729 A1 | 12/1998 |
| DE | 297 23 849 U1 | 8/1999 |
| EP | 0 499 261 A | 8/1992 |
| FR | 2 259 620 A | 8/1975 |
| GB | 1 447 684 | 8/1976 |
| GB | 1549959 | 8/1979 |
| JP | 61 040889 A | 2/1986 |
| WO | WO2005 113458 | 5/2005 |

OTHER PUBLICATIONS

SoilFacts, Swine Manure as a Fertilizer Source, Jan. 17, 2006, p. 1.
Sastry et al., Sampling of Dry Solids and Slurries of Solids, Perry's Chemical Engineering Handbook, 1997, pp. 19-4.
Moyers et al. "Psychrometry, Evaporative Cooling, and Solids Drying", Perry's Chemical Engineering Handbook, 1997, pp. 12-81, 12-84, 12-85, 12-37, Table 12-9.
Department of Energy, "Improving Process Heating System Performance", Sep. 2004, p. 8.

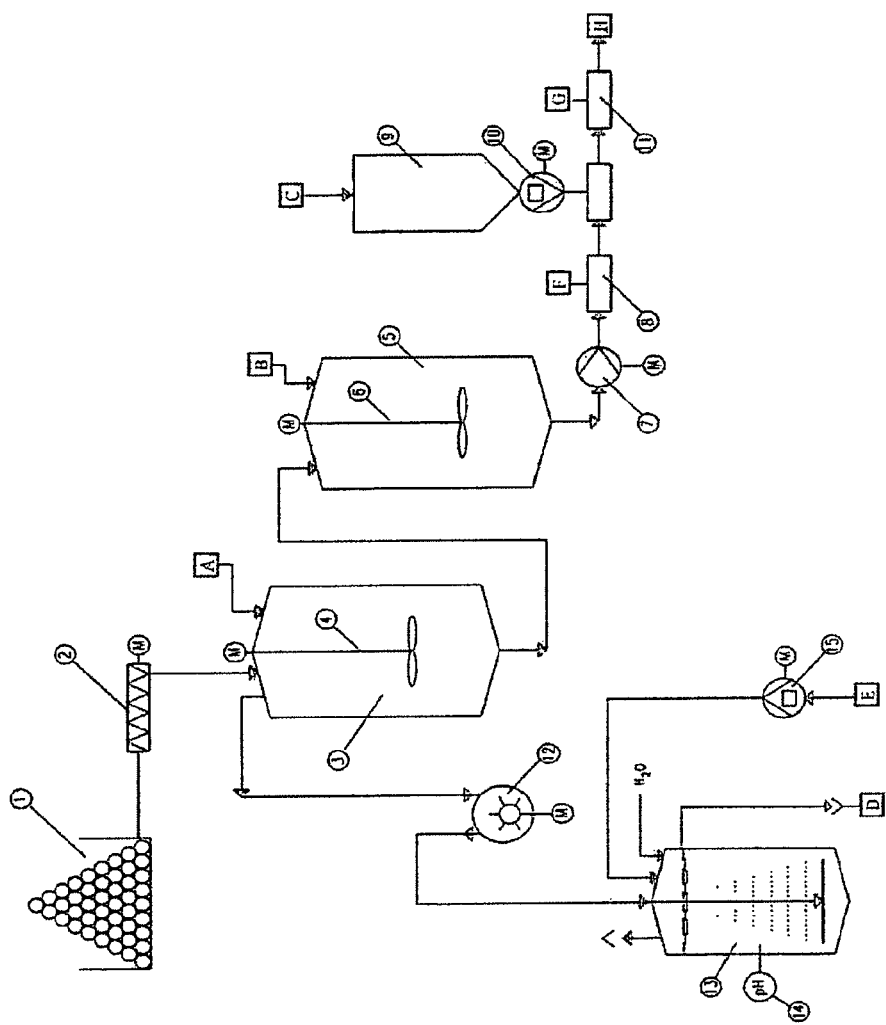

PROCESS FOR THE PRODUCTION OF A PRODUCT BASED ON FAECALS PRODUCED BY ANIMALS AS WELL AS A PLANT FOR THE PRODUCTION OF THE PRODUCT, ESPECIALLY A FERTILIZER PRODUCT

CROSS-REFERENCE TO RELATED APPLICATIONS

The present application is a continuation of prior U.S. patent application Ser. No. 12/528,515, filed Oct. 21, 2009, Jes Thomsen, Kurt Schrøder and Dennis Wowern Nielsen entitled "PROCESS FOR THE PRODUCTION OF A PRODUCT BASED ON FAECALS PRODUCED BY ANIMALS AS WELL AS A PLANT FOR THE PRODUCTION OF THE PRODUCT, ESPECIALLY A FERTILIZER PRODUCT," which is a 35 U.S.C. §371 National Phase conversion of International Application No. PCT/DK2008/050046, filed Feb. 26, 2008, which claims priority of Danish Application Nos. PA 2007 00291, filed Feb. 26, 2007 and PA 2007 01854, filed Dec. 21, 2007. The PCT International Application was published in the English language. The contents of each of the patent applications above-listed are incorporated in full herein by reference.

INTRODUCTION

The present invention relates to a process for the production of a product based on faecals produced by animals as well as a plant for the production of the product. Moreover, the invention relates to the product as such and the use of faecals produced by animals for the production of a germ-free product which is especially suitable as a fertilizer. So far, faecals from, for example, livestock, have been considered a waste product with very limited application. By means of the present invention, faecals are transformed into a useful product that can be applied as fertilizer on the individual farm where it is made or be sold as a commodity.

BACKGROUND OF THE INVENTION

In the present application, the expression slurry is used as the general designation for a mixture of animal urine and excrements. Slurry can be divided into a solid, humid phase designated faecals in this application, and a liquid phase designated liquid manure in this application.

Liquid fertilizer is manufactured in the industry by suspending various nutrient salts in water. These salts have to be easily soluble in water, and they should typically contain nitrogen (N), phosphorus (P), potassium (K), calcium (Ca), sulphur (S), magnesium (Mg), manganese (Mn), copper (Cu), boron (B), chlorine (Cl) or iron (Fe). The composition of these elements will typically be optimized in relation to the type of soil, the crops intended to be fertilized and the growth phase of the crops. These nutrient salts may, for example, be dosed in the form of a suitable combination of the salts: calcium nitrate (source of Ca and N), potassium phosphate (source of K and P), copper sulphate (source of Cu), manganese sulphate (source of Mn) and magnesium sulphate (source of Mg), boric acid (source of B), potassium chloride (source of K and Cl) and ferric citrate (source of Fe). This means that everybody with access to water and suitable water-soluble nutrient salts can combine and mix liquid fertilizer ready for use in the cultivation of arable land, forests, parks, golf courses, etc. Synthetically produced artificial fertilizer is a combination of nutrient salts, but the chemical properties of these nutrient salts do not depend on how they are produced. Therefore, the considerations behind the present invention are more or less to replace chemically produced artificial fertilizer with a product containing nutrient salts deriving from animals, which can be used as fertilizer.

It is well-known that slurry and/or faecals contain nutrient salts so that the slurry/the faecals can in themselves act as a fertilizer. Conventionally, the slurry has been applied directly without substantial treatment for fertilization of fields. However, the smell from a field sprayed with slurry is unpleasant and may be the subject of complaints from built-up areas close to the farm.

Methods for chemical treatment of slurry are known. An example of this is the addition of sulphuric acid, symbolized by $H^+$ in the example below. This treatment is made to limit the evaporation of ammonia, symbolized by $NH_3$ in the example below, from the slurry. Urea excreted in the liquid manure of mammals is degraded into ammonia in the slurry. This ammonia is claimed to inhibit the growth rate of mammals and to pollute the immediate animal house environment. When sulphuric acid is added to the slurry, the pH will drop and the ammonia will be transformed into ammonium ions according to the formula:

$NH_3$ (dissolved in slurry phase)$+H^+ \rightarrow NH^+_4$ (dissolved in slurry phase). The formation of ammonium ions, $NH^+_4$, thus inhibits the phase transition: $NH_3$ (dissolved in slurry phase) $\rightarrow NH_3$ (dissolved in the house atmosphere), as the ammonium ion cannot evaporate. As shown by the example, the only purpose of the above method is to bind the ammonia to the slurry phase to limit the ammonia emission from the animal house. Actual processing into a commodity is not covered by the method. Moreover, the method relates to the entire slurry phase.

DK 134545 describes a method for producing a fertilizer product by treatment of animal dung with mineral acids and subsequent neutralization of the acid with a base. Preferably, sulphuric acid is used in the method, but nitric acid or phosphoric acid may also be used. However, the acid concentration used is moderate (pH is preferably around 1), and there is no obvious degradation or oxidation of the substrate, nor are any advantages of degrading or oxidizing the components of the animal dung described. The method is especially suitable for poultry fertilizer.

DD 134477 describes acid-catalyzed hydrolysis of animal dung for the winning of feedstuffs. The hydrolysis may be carried out by means of inorganic acids, and preferably concentrated hydrochloric acid is used. The process takes place at a temperature of approx. 100° C. After completed acid hydrolysis, the acid is neutralized with a base.

DE 301550 describes treatment of animal wastes with nitric acid followed by neutralization (with chalk) for the production of a product. The particular results of the treatment are not described in detail.

GB 1549959 describes a method for the production of a nutrient medium for micro-organisms through pressurized hydrolysis of slurry with mineral acids as a catalyst at an increased temperature. The hydrolysis is preferably carried out with sulphuric acid, and it is followed by neutralization with ammonium hydroxide.

It is not known that the synthetically produced nutrient salts normally supplied as artificial fertilizer may be produced directly at the animal producer's farm in connection with post-treatment of faecals and/or slurry from mammals.

Urease inhibition may be mentioned as another example of chemical treatment. Urease is an enzyme secreted with the faecals of mammals. Urease catalyzes the hydrolysis of the natural urea content in the liquid manure into ammonia. The method suggests processing of the liquid manure. Thus, the formation of, for example, the polymer urea formaldehyde through the addition of various reagents to a pretreated fraction of the liquid manure is suggested for further export. It should be noted that the method does not comprise the faecals, but only the liquid manure.

The object of the present inventions is to supply the soil with nutrient salts from animal faecals in a suitable form that does not present odour nuisances to any notable extent. Another object of the invention is to provide a useful product that can be used as fertilizer on the lands belonging to the farm on which the slurry is produced or to make the product an object of trade. Yet another object is to render possible the production of a larger number of slaughter animals than is permitted by the authorities on the basis of the soil area available.

DESCRIPTION OF THE INVENTION

The present invention relates to a process for the production of a product based on faecals produced by animals, characterized in that: a. faecals from mammals are wholly or partially dissolved using an oxidizing acid,
b. solid acid-insoluble components are separated, if necessary, and
c. the liquid component is neutralized with a base.

The dissolution of the faecals and the subsequent neutralization surprisingly provides a substantially odourless product. This product may be supplied directly to a cultivated area as fertilizer, whereby nutrient salts deriving from the faecals are used as fertilization for a crop.

The oxidizing acid may be any oxidizing acid or other oxidation agents dissolved in acid. The oxidizing acid is preferably selected from the group consisting of nitric acid ($HNO_3$), nitric acid mixed with $NO_2$ (fuming nitric acid), peroxynitric acid (HNO4), peroxophosphoric acid ($H_3PO_5$, $H_4P_2O_5$), hypophosphoric acid ($H_4P_2O_6$), pyrophosphoric acid ($H_4P_2O_7$), peroxodiphosphoric acid ($H_4P_2O_8$), peroxosulphuric acid ($H_2SO_5$), thiosulphuric acid ($H_2S_2O_3$, $H_2S_2O_4$, $H_2S_2O_5$, $H_2S_2O_6$), pyrosulphuric acid ($H_2S_2O_7$), peroxydisulphuric acid ($H_2S_2O_8$), hypochlorous acid (HClO), chlorous acid ($HClO_2$), chloric acid ($HClO_3$), perchloric acid ($HClO_4$), bromic acid ($HBrO_3$), iodic acid ($HIO_3$), periodic acid ($HIO_4$, $H_5IO_6$), peroxalic acid, performic acid, peracetic acid and perbenzoic acid or a mixture of two or more thereof.

In one aspect of the invention, the oxidizing acid is used together with a further non-oxidizing acid to improve the solubility of the faecals. The further non-oxidizing acid may be selected from the group consisting of hydrochloric acid, sulphuric acid, formic acid, chloroformic acid, monochloroacetic acid, dichloroacetic acid, trichloroacetic acid, oxalic acid and maleinic acid, or the non-oxidizing acid may be a mixture of two or more of these acids.

In a preferred aspect of the invention, the oxidizing acid is nitric acid. Nitric acid contains the nitrate ion ($NO_3^-$), which has a well-known fertilizing effect. The use of nitric acid may increase the fertilizing value of the product that can be produced from faecals. Particularly good dissolving properties are obtained if a further, non-oxidizing acid selected from strong acids, such as hydrochloric acid or sulphuric acid, is added to the faecals simultaneously with the addition of nitric acid. Hydrochloric acid is especially preferred because this acid has little or no tendency to carbonize the components of the faecals.

Certain acids tend to cause carbonization of certain organic substances in the animal faecals. In particular, undigested carbohydrates eliminated with the faecals from the animals may lead to carbonization. These carbon residues may have a mechanically inhibitory effect in the technical plant forming the physical framework of the dissolution of the faecals. The oxidizing acid, possibly in combination with one or more non-oxidizing acids, is preferably selected so that the carbonization will not occur to any major extent. Moreover, in the selection of an oxidizing acid, possibly in combination with a non-oxidizing acid, care should be taken that the acid combination as such is compatible with the metal alloys in the plant that will be in direct contact with the acid combination. Certain types of steel are thus incompatible with sulphuric acid, and care should therefore be exercised at the selection of this acid. As the start of selecting the acid combination, it should thus be ensured that the faecals can be adequately dissolved at the desired rate, at the selected temperature, without any substantial formation of carbonized product residues and that the corrosive properties of the technical plant in contact with the acid combination are sufficient to avoid substantial corrosion of the equipment. Through initial experiments, it is within the scope of the worker skilled in the art to determine an acid combination meeting the specifications made.

The oxidizing acid is preferably applied in a high concentration to obtain the highest possible degree of dissolution of the faecals. In the case where nitric acid is used, it is preferably used in a concentration exceeding 10 percent by weight. A commercially available nitric acid in a concentration of 33 percent by weight has proved suitable.

The type and quantity of the oxidizing acid, possibly in combination with a further non-oxidizing acid, are preferably chosen so that at least 50 percent by weight of the faecals, calculated on the basis of the dry matter content, is dissolved. Preferably 70 percent by weight or more of the faecals is dissolved. Increased dissolution of the faecals renders a correspondingly increased amount of the nutrients deriving therefrom available so that the fertilizing potential of the faecals is better utilized.

Under favourable conditions, substantially the total quantity of faecals is dissolved. Only insoluble components, such as stones and other foreign bodies, remain undissolved. Sometimes, organic components remain undissolved, and they are typically separated in step b. The separated humid, solid fraction is suitably treated with a strong base to dissolve such components at least partially. The strong base may be selected from alkali metal hydroxide, alkaline earth metal hydroxide or an aqueous solution of alkali metal phosphate. Particularly preferred as the strong base is sodium hydroxide.

The neutralizing step c of the process may be carried out with any base able to neutralize the liquid component. The neutralizing step is preferably carried out with a base selected from the group consisting of ammonia water ($NH_4OH$), alkali metal hydroxide, alkaline earth metal hydroxide, an aqueous solution of alkali metal phosphate and an aqueous solution of ammonium (hydrogen) phosphate. In one embodiment, the basic liquid phase obtained in the possible step for further solubilization of solid components is used for the neutralisation after the oxidizing acid treatment.

To provide a product with a fertilizing value adapted to particular cultivation conditions, it is important to know the composition of the product. The content of nitrogen, phosphorus, potassium and other components may thus be measured at any step of the process. In preferred embodiments, the content of nitrogen, phosphorus and potassium is measured after step b or c. The content of nitrogen, phosphorus and potassium may further be adjusted by adding components containing phosphorus, potassium and possibly nitrogen so that a predetermined ratio between nitrogen, phosphorus and potassium (NPK) is obtained. Similarly, the content of calcium (Ca), sulphur (S), magnesium (Mg), manganese (Mn), copper (Cu), boron (B), chlorine (Cl) and iron (Fe) may be measured, and if necessary a source of one or more of these substances may be added to achieve a predetermined ratio between the substances.

The neutralization in step c may be carried out in a way so that the pH for the final product is taken into consideration. It is thus possible to neutralize using a quantity and type of base so that the final pH of the product is in the interval of 4 to 10. In a preferred embodiment, the neutralization is carried out so that the pH of the product is in the interval of 6 to 8. If desired, the neutralization in step c may be carried out before the separation of solid components in step b. Another suitable possibility is to carry out a separation step after carrying out the neutralization in step c.

The process according to the invention may be applied to faecals from all types of usual domestic and farm animals. However, the process is particularly advantageous for application with faecals produced by pigs. Faecals from pigs can be provided by separating the liquid fraction (liquid manure) from slurry.

The product produced according to the process can be applied directly in the liquid form obtained or in a dried or otherwise concentrated form. In one embodiment, the process comprises a further step d, in which the product is dried to obtain a concentrate or a solid product. This drying may be provided by at least partially applying the heat developed in step a for evaporation. The drying may also be carried out in another way, such as by spray drying.

The invention also relates to the product as such obtained by the process mentioned above. The product may be in a solid or liquid form. If the product is in a liquid form, it may be concentrated relative to the liquid phase provided in step c, or it may have the same concentration as the liquid phase from step c. As a solid product, it may be in the form of powder, particles, flakes or granulate.

The invention further relates to a plant for producing a product according to the invention. The plant comprises:

(i) a faecal reactor (3) for receiving animal faecals, wherein the reactor is provided with means for supplying an oxidizing acid; (ii) possibly a separator unit for separation of solid acid-insoluble components; and (iii) a neutralizing reactor (5) for neutralizing the part of the faecals dissolved by the oxidizing acid, wherein the neutralizing reactor (5) is provided with means for supplying a base.

The faecal reactor may further be provided with means for venting off gases produced during the treatment of faecals with oxidizing acid. In one embodiment, the faecal reactor is connected to a vacuum pump above the means for venting off gases produced, in order to maintain a pressure in the faecal reactor below atmospheric pressure. The plant may further comprise a gas collector connected to the faecal reactor for collecting the vented gases.

The faecal reactor of the plant may be made of any material, but it is preferably made of or lined internally with a material that is not substantially degraded by an oxidizing acid. The faecal reactor may be provided with means for mixing the contents, such as a stirrer.

The possible separator unit of the plant is preferably a drum filter, although other separator types, such as a cyclone, may be used.

In a preferred embodiment, the plant comprises one or more chemical silos and associated dosing pumps for supplying further substances to the product. These chemical silos may be used for storing oxidizing acids, other acids, base for neutralization and other chemicals that may be added as needed according to the process of the invention. Chemical silos and dosing pumps are preferably made of or lined internally with a material that is not substantially degraded by oxidizing acids, bases or the other chemicals.

In addition, the plant may be provided with means for the recovery of heat so that the heat can be utilized in any heat-demanding steps of the process, such as evaporation. Heat will particularly develop at the addition of the oxidizing acid to the faecals, and the plant is preferably provided with means for recovering heat developed during this step.

In one embodiment, the plant further comprises a device for drying the product. The device for drying the product may be any suitable device, but in preferred embodiments the device is suitable for evaporation or spray drying.

BRIEF DESCRIPTION OF THE DRAWING

FIG. 1 shows a flowchart for a plant according to the invention.

DETAILED DESCRIPTION OF THE INVENTION

In the process of the invention, faecals produced by animals are processed by transforming the faecal components from a water-insoluble form into a water-soluble form. The processing consists in treating the faecals with an oxidizing acid so that the insoluble (organic) substances undergo a reaction similar to combustion (reaction with oxygen). The difference between oxygen and oxidizing acid is that oxygen transforms the complex organic structures into carbon dioxide and water in a complete combustion, whereas the oxidizing acid causes the complex compounds existing in faecals to be degraded into smaller, but more water-soluble components due to the acidic and oxidizing conditions. The particular advantage obtained by the invention is thus that:

Organic matter in faecals+oxidizing acid→water-dissolved matter.

The process of the invention may be carried out with any oxidizing acid, or an acidic solution of an oxidizing agent may be used. Nitric acid is particularly suitable as oxidizing acid. When nitric acid is used, nitrate ions that will remain dissolved in the aqueous phase comprising the components solubilized by the treatment are added in addition to the oxidizing effect of the acid. The dissolved nitrate will thus contribute as a component of the product. The oxidizing acid is preferably used in a high concentration, such as in the form of so-called concentrated nitric acid. The high concentration will contribute to an effective reaction between oxidizing nitrate ions and undissolved components. Moreover, in some embodiments non-oxidizing acid will be added to the reaction mixture in order to further increase the concentration of $H^+$ ions. For this purpose, relatively strong acids are preferred. The high concentration of acid also provides the further advantage that all germs present, such as bacteria, bacterial spores, virus particles, fungus spores, amoebae, etc., are substantially destroyed. The use of untreated slurry causes problems as the slurry contains a high germ count of, for example, intestinal bacteria whose presence on the field is undesired. Fertilization with a product produced according to the process of the invention prevents this problem. Similarly, other undesired organic pollutants, such as natural hormones or any drug residues potentially present in the slurry will also be degraded sufficiently so as to no longer possess their prior biochemical effect.

The reaction between the oxidizing acid and the faecals preferably proceeds until at least 50 percent by weight, more preferably at least 70 percent by weight, calculated on the basis of the dry matter content of the faecals, is dissolved. The quantity of oxidizing acid used has to be sufficient to provide the solubilization. The ratio between the quantity of oxidizing acid and the dry matter content of the faecals may be from approx. 0.5 to approx. 5 (g of acid/g of dry matter), preferably 1 to 3 g/g of dry matter. The oxidizing acid may be added to the faecals in one portion, or the oxidizing acid may be added gradually in smaller portions until all the oxidizing acid has been added. The acid is preferably added with simultaneous mixing, for example by stirring, with the faecals. Preferably, the mixing is continued during the entire course of the reaction.

The reaction time also has to be sufficient to obtain the desired solubilization of the faecals. The type and quantity of reactants is usually balanced so that the reaction time is less than 10 hours to ensure sufficient process economy. Normally, the reaction time cannot be less than 30 minutes as this would require a relatively large proportion of the oxidizing acid. The reaction time may, for example, be from approx. 1 to approx. 10 hours, preferably 3 to 6 hours. The reaction will generally be carried out at a slight underpressure, for example approx. 800 mbar. The underpressure may be provided by means of a vacuum pump serving at the same time to vent off gases from the reaction. The pressure may suitably be measured in a pipe venting the gas from the reaction container, which thereby provides a measure of the pressure in the container.

The reaction between the oxidizing acid and the faecals will lead to the development of heat, and therefore measurement of the temperature in the reaction container may be relevant. Accordingly, a thermometer or a temperature electrode may be arranged in connection with the reaction mixture. The heat developed may possibly be conducted away from the reaction mixture, thereby causing a simultaneous cooling of the reaction mixture. If necessary, further heat may also be supplied to advance the reaction. Both the supply to and conducting away of heat from the reaction mixture may be carried out by passing a suitable fluid, such as water or steam, at a suitable temperature through a pipe or conduit encapsulating the reaction container. The flow rate of the liquid may be adapted according to need, for example relative to the amount of heat to be conducted away or supplied.

After completed reaction between oxidizing acid and suspended faecals, the liquid component of the reaction mixture is neutralized with a base. The reaction container may be provided with a pH electrode in connection with the reaction mixture for pH measurement. Any suitable base may be used for the neutralization. The addition of base may be controlled by information from the pH electrode, which may thereby function in a feed-back loop so that pH is measured after the gradual addition of base, and the measured value is used for estimating the further need for the addition of base. Preferably, the pH is adjusted to obtain a pH in the final product of approx. 4 to approx. 10, preferably from approx. 6 to approx. 8.

Any remaining solid components may be separated from the suspension after the reaction. The separation may be made by the use of centrifuging, for example in a decanter centrifuge, or filtration, for example by means of a drum filter, filtration being preferred. The separated solid components may further be treated with a strong base, such as sodium or potassium hydroxide, in order to at least partially dissolve these components. The liquid component formed thereby may also be used as a base in the neutralizing step.

Before or after the neutralizing step, the composition of the liquid components may be measured. The measurement can be made by taking a sample which is analyzed using a suitable method, such as atomic absorption spectrophotometry, flame photometry, mass spectrometry, etc. Particularly the content of nitrogen, phosphorus and potassium is important, but also the content of calcium (Ca), sulphur (S), magnesium (Mg), manganese (Mn), copper (Cu), boron (B), chlorine (Cl) and iron (Fe) may be of interest to obtain the optimum composition. Any suitable base may be used for the neutralization, and depending on composition the base may further serve to change the substances in the liquid component. Accordingly, ammonia water ($NH_4OH$), alkali metal hydroxide, alkaline earth metal hydroxide, an aqueous solution of alkali metal phosphate or an aqueous solution of ammonium (hydrogen) phosphate is preferred for the neutralization. The bases may be used alone, or a mixture thereof may be used. When measuring the nitrogen content and assessing the need for adding nitrogen, a distinction may be made between reduced nitrogen ($NH_3$) and oxidized nitrogen ($NO_3^-$) so that the ratio between the two is balanced. The ratio by quantity between added bases may be balanced so that the content of nitrogen, potassium and phosphate in the final product is adjusted to obtain a desired composition. The desired composition may also be obtained by adding other compounds containing nitrogen, phosphorus or potassium, or compounds comprising other nutrients may be added, such as calcium (Ca), sulphur (S), magnesium (Mg), manganese (Mn), copper (Cu), boron (B), chlorine (Cl) and iron (Fe).

The liquid product provided may be further concentrated or dried to reduce the water content and facilitate handling. Drying or concentration may be carried out by evaporation or spray drying or a combination of these methods. As an example, the heat which is conducted away from the reaction container in the form of a heated liquid may be used in an initial step for evaporation. In this evaporation step, the liquid components will thus be heated with the excess heat, which causes evaporation of water. Further heat may be supplied as required to obtain a desired degree of evaporation. The liquid components from the reaction container may be passed to a suitable spray dryer immediately or after initial evaporation.

The process is particularly suited for treatment of faecals from large livestock herds, such as from pigs. In that case, the faecals are obtained by separating the liquid fraction (liquid manure) from slurry. Such separation may be provided by, for example, sedimentation in a storage tank, filtration on a drum filter or centrifuging in a decanter centrifuge.

In yet another aspect of the invention, the components so evaporated or spray dried, or the liquid components from the reaction mixture are used for a product. Such product may be in the form of a liquid intended for direct application to a cultivated area, or it may be a liquid intended for dilution with water before use. The product may also be in solid form for direct application to a cultivated area. Suitable solid forms may be powder, particles, granulate, flakes and the like. In this form the size of the individual particles will typically be in the interval from 0.1 mm to 10 mm. When in solid form, the particles of the product may have a different composition so that each particle comprises a core of one composition and one or more outer layers of another composition. The product may have had further ancillary materials added, which are used, for example, during granulation, or which ensure rapid release of the fertilizing substances to the soil, or colouring agents may be added to help the user identify the type and composition of the product.

Whether the product is a liquid or a solid, the product is not limited to use as fertilizer. Thus, due to its salt content, among other things, the product may also be used in concrete, where it may act as a concrete curing compound. The chemical composition of the product may further serve in the production of bulk chemicals, or amino acids may be recovered from the product. Such and other chemical substances can be recovered from the product by the use of methods known to a worker skilled in the art, for example extraction with ethanol.

Plant for the Production of Product

A third aspect of the invention relates to a plant for the production of the product. Such plant may be set up with an animal producer who owns, for example, a pig farm which supplies the faecals for the production of a product. In such case the plant will be scaled to a size suitable for the number of pigs on the farm. As an example, a pig farm with around 500 slaughter pigs in its houses will need a plant for treatment of 5 periods/year×500 slaughter pigs/period×0.45 tonnes/slaughter pig=1125 tonnes of slurry per year, which could be provided with a faecal reactor of just under 21 $m^3$, if the holding time in the reactor is set at 1 hour, and 1 tonne of faecals is set at 1 $m^3$. In this description, slaughter pigs means pigs fattened up from 30 to 102 kg over approx. 72 days. On average, a slaughter pig will generate 450 kg of slurry during its life, or 6.25 kg per day. Of this, approx. 3 kg is liquid manure, and 1 kg is faecals, the rest is washing water in connection with the operation of the pig farm. Accordingly, just over 500 kg of faecals is produced per day in the said example.

The plant may also be set up centrally to take slurry/faecals from several surrounding pig farms, and in that case the plant will be proportionally larger.

Regardless of size, the plant will comprise a faecal reactor (3), which may be a reactor tank of stainless steel lined on the inside with a layer of a polymer material, such as polyethylene, polyester or fluorinated polymers, such as polytetrafluoroethylene (also known as Teflon), which is resistant to the oxidizing acid. The faecal reactor will be connected to a storage tank for oxidizing acid (A) through suitable means for the supply thereof and may comprise means (2) for the supply of faecals from a faecal store (1). Oxidizing acid may be supplied to the faecal reactor (3) through acid-resistant pipes by means of a pump, such as a centrifugal pump or a peristaltic pump. Faecals may be supplied from a faecal store (1) by means of, for example, a screw conveyor or a conveyor belt (2). For mixing faecals with oxidizing acid, the faecal reactor (3) may have a stirrer (4), which is also made of a material resistant to oxidizing acid, and which has one or more blades or paddles of a design suitable for obtaining mixing of the contents of the faecal reactor (3). The faecal reactor (3) may be designed so that it is suitable for operation at a maintained pressure which can be controlled to be higher or lower, preferably lower, than atmospheric pressure. The faecal reactor (3) may, for example, be made to work at a slight underpressure, such as approx. 800 mbar absolute, relative to atmospheric pressure.

Moreover, the faecal reactor (3) may be provided with measuring electrodes, such as for measuring pH, conductivity, pressure and/or temperature, and it may be provided with sampling equipment for sampling the contents for analysis.

In some embodiments, the faecal reactor (3) may comprise a system for conducting away the heat developed by reactions in the faecal reactor (3). Such a system may comprise pipes with a flowing liquid, such as cold water, the contents of which pipes is in heat-conducting contact with the contents of the faecal reactor (3). The system may thus comprise a suitable length of pipes inside the faecal reactor (3), or the pipes may encapsulate the reactor on an outer surface. The length and diameter of the pipes and the material thereof necessary for suitable heat conduction may be calculated by a worker skilled in the art of heat exchangers and their design, but the diameter of the pipes will typically be smaller than 5 cm, and their length will depend on the scale of process of the faecal reactor (3). If the pipes are inside the faecal reactor (3), they will be made in a material able to withstand the oxidizing acid. The worker skilled in the art will also have knowledge of the necessary flow rate for the coolant in the pipes and the inlet temperature of the coolant, but for water the inlet temperature will typically be in the range from approx. 5° C. to 15° C. The system for conducting away the heat is preferably constituted by a closed circuit with a limited need for the supply of coolant.

The flow of liquid or suspension from the faecal reactor (3) is passed to a neutralizing reactor (5), possibly through the filter described below, through suitable pipes which have been treated at least on the inside surface to withstand the oxidizing acid. The connection between the faecal reactor and the neutralizing reactor (5) may comprise a pump, such as a centrifugal pump, to advance the liquid flow between the reactors. The neutralizing reactor (5) typically has approx. the same volumetric size as the faecal reactor (3). The neutralizing reactor (5) is connected to storage tanks (B) for bases through suitable pipes provided with suitable dosing pumps, such as centrifugal pumps, peristaltic pumps or gear pumps so that bases can be added in calculated quantities and ratios. The number of storage tanks (B) for bases corresponds to the need for the number of different types of bases for addition to the contents from the faecal reactor (3). The neutralizing tank (5) may also be provided with a stirrer (6) comprising one or more blades or paddles, and it may be connected to a discharge pump (7) intended to discharge liquid from the neutralizing reactor (5) and a device for measuring the flow rate (8/F).

In addition, the neutralizing reactor (5) may be provided with measuring electrodes and may comprise sampling sites.

Moreover, the plant may comprise a filter, such as a drum filter, for separating acid-insoluble components. The filter may be arranged between the faecal reactor (3) and the neutralizing reactor (5), or it may be arranged downstream of the neutralizing reactor (5). The size of the filter is adapted to the size of the faecal reactor (3) and the related need for filtration. Although filtration is preferred, this separation process can also be carried out by means of a centrifuge, such as a decanter centrifuge, made in acid-resistant materials.

The faecal reactor (3) may also be provided with means for venting off gases produced by the reaction between faecals and oxidizing acids. The means may comprise a vacuum pump (12) connected to the faecal reactor (3) through a suitable pipe. The pipe will typically comprise a pressure meter that can contribute to adjusting the pressure in the faecal reactor (3) to a predetermined pressure. The vacuum pump (12) may be connected to a gas collector (13) for receiving vented gases. The gas collector (13) may, for example, be a stripper in which the gas is bound to a liquid phase to prevent the gas from been vented to the atmosphere. The gas collector (13) may be provided with measuring electrodes (14) for measuring, for example, pH, conductivity and/or temperature, and it may be connected to one or more dosing pumps (15) each connected to a storage tank (E) for acid or base so that the pH in the gas collector (13) may be adjusted as needed. Liquid may be removed from the gas collector (13) through a drain (D).

The plant may further comprise one or more chemical silos (C/9) for storing further substances for the product. Such chemical silos (C) may be connected to the neutralizing tank (5) through one or more dosing pumps (10) and suitable pipes, or they may be connected to a mixer (G/II) suitable for mixing flowing liquids.

The mixed liquid flow comprising all nutritive components for a product may be passed to a storage tank or a tanker (H) for further processing later or for direct use.

In other embodiments, the plant also comprises a device for drying the liquid product. In this context, "drying" means removing water from the product. The drying may thus be concentration that increases the concentration of active fertilizing substances and reduces the volume of the liquid, or it may remove sufficient water from the product to turn it into solid form. The device may thus be an evaporator or a spray drying device. In yet another embodiment, the plant comprises both an evaporator and a spray drying device arranged sequentially. Both in case of the use of an evaporator and/or a spray drier, the plant may be designed so that the need for heating of liquids for drying is at least partially satisfied through heating with the heat conducted away from the faecal reactor (3). In such case, the pipe system for conducting the heat away from the faecal reactor (3) will be designed so that the heated liquid flowing from the faecal reactor (3) is brought into heat-conducting contact with the liquid to be dried. The heat conducting contact may be provided by coiling pipes with the heated liquid around pipes containing the liquid to be dried in order to promote the heat transfer between the two pipe systems. The design and dimensioning of the two pipe systems will be known to the worker skilled in the art, but the design and dimensioning may depend on the need for cooling of the faecal reactor (3) described above. The heating of the liquid to be dried may be made according to the principles for downflow or counterflow heat exchangers, or the liquid to be dried may be substantially stagnant in a pipe or a differently designed container.

The need for other pumps, pipes and valves and their type and design are deemed to be known to a worker skilled in the art, and no such units are indicated in the drawing.

EXAMPLE

Four portions each of 100 g of dried pig faecals were suspended in 100 ml reaction liquid comprising water, concentrated sulphuric acid, concentrated hydrochloric acid or concentrated nitric acid, respectively. The reactions were carried out in a 500 ml round bottom rotary flask in a vacuum evaporator of the Büchi brand. During 4 hours' reaction, the thermostated water bath of the evaporator was kept at 50° C., and the pressure in the rotary flask was kept at 800 mbar by means of an automated pressure control. The rotary flask rotated at 100 rpm. After completed reaction, the flasks were opened, and the pH of the contents was adjusted to 7 by means of the addition of concentrated sodium hydroxide. The four reaction mixtures were then filtered on 9 cm diameter filters using a Buchner funnel placed on a 1 litre suction flask. The pressure of the suction flask was approx. 100 mbar, and in each case 1 hour's suction time was applied. The filter cake mass was measured by weighing the filter and comparing with the filter mass before filtration. The results are summarized in Table 1.

TABLE 1

Results from treatment of faecals with different reaction liquids

|  | Water (ref.) | $H_2SO_4$ | HCl | $HNO_3$ |
|---|---|---|---|---|
| Faecals (g) | 100 | 100 | 100 | 100 |
| Reaction liquid, volume (ml) | 100 | 100 | 100 | 100 |
| Filter cake (g) | 94.6 | 83.5 | 84.4 | 26.7 |

As shown in Table 1, the reaction with water had only a limited effect on the change in the faecal mass. This effect is most likely attributable to the presence of a small quantity of soluble material in the dried faecals. Reaction with the concentrated non-oxidizing acids, sulphuric acid and hydrochloric acid, resulted in solubilization of a larger quantity of material than reaction with water alone. This increase may derive from limited degradation of the material caused by the acid, such as decomposition of carbohydrate chains into soluble carbohydrates. When the reaction was carried out with oxidizing nitric acid, a remarkably greater degradation of the material into soluble components was observed. If the 26.7 g of undissolved material was subjected after the treatment to a treatment step with 26.7 g of sodium hydroxide, the quantity retained was reduced to 18.8 g. Thus, more than one reaction step may advantageously be used to degrade insoluble material, as a multi-step process may increase the total quantity of material to be recovered from the faecals.

The invention has been illustrated herein with nitric acid as the oxidizing acid. It may be expected, however, that the nitric acid may be replaced by other oxidizing acids that will provide a similar solubilizing effect. The present invention is thus not limited to this particular embodiment, and the worker skilled in the art will realize that other oxidizing acids can also be used to obtain the dissolution of faecals. In case of a relatively weak oxidizing acid, the worker skilled in the art will realize that the necessary high concentration of $H^+$ can be obtained through the addition of a non-oxidizing acid.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A process for the production of a fertilizer product based on faecals produced by animals, wherein:
    a. faecals from mammals are provided by separating liquid manure from slurry,
    b. the faecals of step a are processed within less than 10 hours with an oxidizing acid to transform at least 50% by weight of the faecals, calculated on the basis of dry matter content of the faecals components from a water insoluble form into a water soluble form, and whereby heat is formed by the reaction, c. a pressure below atmospheric pressure is applied in the reaction of step b, d. solid water-insoluble components are separated to provide a liquid component and solid water-insoluble components, e. after completing processing the liquid component is neutralized with a base, in order to form said fertilizer product, f. the solid water-insoluble components of step d are treated with a strong base in order to at least partially dissolve these components, and g. the solid water-insoluble components dissolved in step f are used in the neutralization of step e.

2. The process according to claim 1, wherein the oxidizing acid is selected from the group consisting of nitric acid ($HNO_3$), nitric acid mixed with $NO_2$ (fuming nitric acid), peroxynitric acid ($HNO_4$), peroxophosphoric acid ($H_3PO_5$, $H_4P_2O_5$), hypophosphoric acid ($H_4P_2O_6$), pyrophosphoric acid ($H_4P_2O_7$), peroxodiphosphoric acid ($H_4P_2O_8$), peroxosulphuric acid ($H_2SO_5$), thiosulphuric acid ($H_2S_2O_3$, $H_2S_2O_4$, $H_2S_2O_5$, $H_2S_2O_6$), pyrosulphuric acid ($H_2S_2O_7$), peroxydisulphuric acid ($H_2S_2O_8$), hypochlorous acid (HClO), chlorous acid ($HClO_2$), chloric acid ($HClO_3$), perchloric acid ($HClO_4$), bromic acid ($HBrO_3$), iodic acid ($HIO_3$), periodic acid ($HIO_4$, $H_5IO_6$), peroxalic acid, performic acid, peracetic acid and perbenzoic acid and a mixture of two or more thereof.

3. The process according to claim 1, wherein the oxidizing acid is used in admixture with a further acid selected from the group consisting of hydrochloric acid, sulphuric acid, formic acid, chloroformic acid, monochloroacetic acid, dichloroacetic acid, trichloroacetic acid, oxalic acid and maleinic acid.

4. The process according to claim 1, wherein the oxidizing acid is nitric acid.

5. The process according to claim 1, wherein the oxidizing acid is used in a concentrated form.

6. The process according to claim 1, wherein the oxidizing acid is nitric acid in a concentration of 10 percent by weight or more.

7. The process according to claim 1, wherein the volume and type of oxidizing acid added to the faecals in step (a) are sufficient to dissolve at least 70 percent by weight of the faecals, calculated on the basis of the dry matter content.

8. The process according to claim 1, wherein at least one of the base and the strong base is selected from alkali metal hydroxide, alkaline earth metal hydroxide and an aqueous solution of alkali metal phosphate.

9. The process according to claim 8, wherein the strong base is sodium hydroxide (NaOH) or potassium hydroxide (KOH).

10. The process according to claim 1, wherein the neutralization in step (e) is carried out with a base selected from the group consisting of ammonia water ($NH_4OH$), alkali metal hydroxide, alkaline earth metal hydroxide, an aqueous solution of alkali metal phosphate and an aqueous solution of ammonium hydrogen phosphate.

11. The process according to claim 1, wherein the content of nitrogen, phosphorus and potassium is measured after step (b) or (e).

12. The process according to claim 11, wherein components containing phosphorus, potassium or nitrogen are added so that a predetermined ratio between nitrogen, phosphorus and potassium (NPK) is obtained.

13. The process according to claim 11, wherein the content of one of more substances selected from calcium (Ca), sulphur (S), magnesium (Mg), manganese (Mn), copper (Cu), boron (B), chlorine (Cl) and iron (Fe) is measured, and a source of one or more of these substances is then added if necessary to obtain a predetermined ratio between the substances.

14. The process according to claim 1, wherein the neutralization in step (e) is carried out with a quantity and type of base so that the final pH of the fertilizer product is in the interval of 4 to 10.

15. The process according to claim 1, wherein the pH of the fertilizer product is in the interval of 6 to 8.

16. The process according to claim 1, wherein the faecals are produced by pigs.

17. The process according to claim 1, wherein the process further comprises:
   e2 drying the fertilizer product to obtain a concentrate or a solid product.

18. The process according to claim 17, wherein the drying is carried out at least partially by evaporation using heat produced in step (b).

19. The process according to claim 17, wherein the drying is carried out by spray drying.

20. The process according to claim 1, wherein a base is added during the processing in step (b).

* * * * *